April 18, 1933.  C. P. CLARK ET AL  1,904,854
DOUBLE ACTING INTERNAL COMBUSTION ENGINE
Filed May 12, 1930
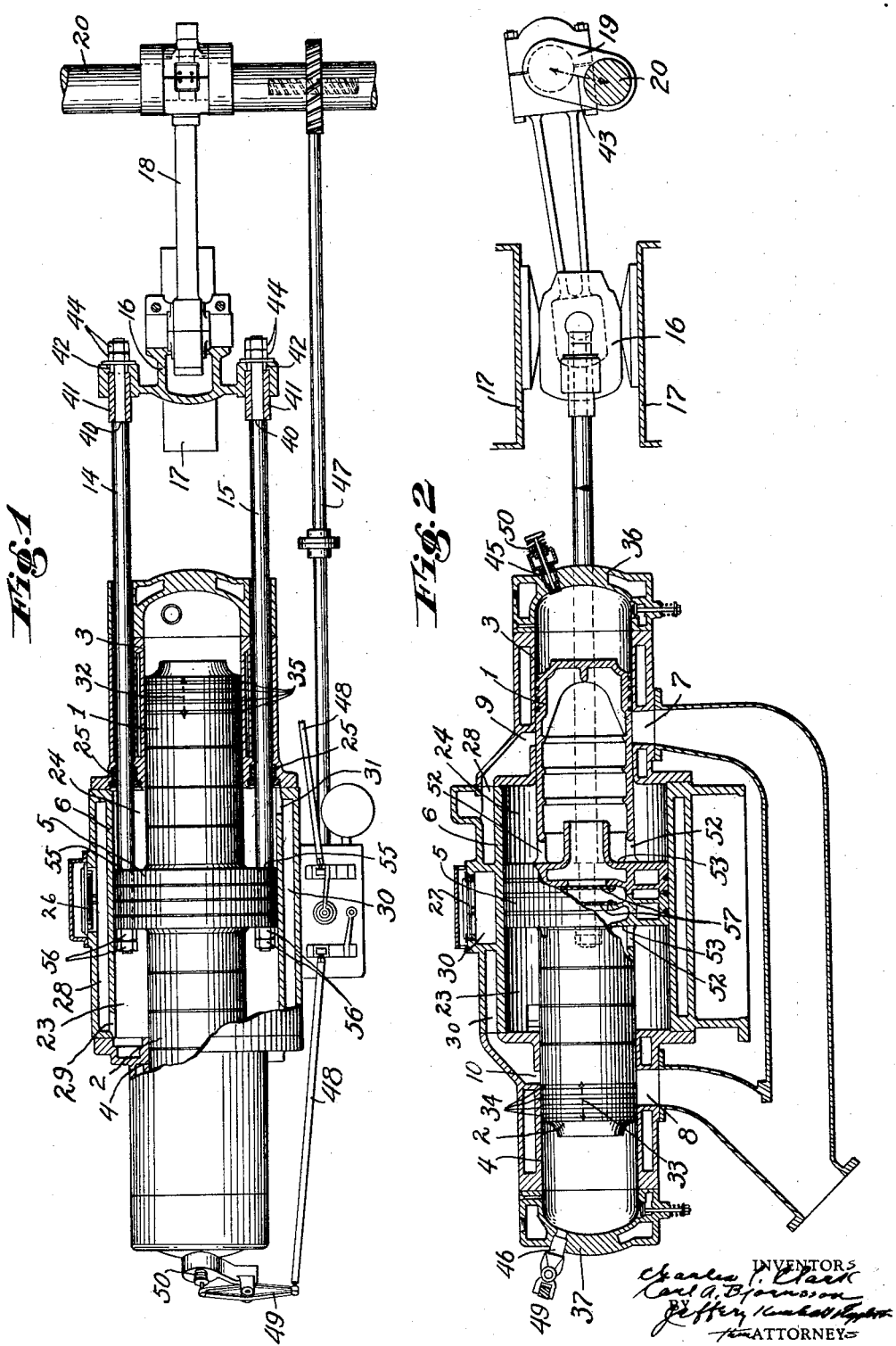

Patented Apr. 18, 1933

1,904,854

UNITED STATES PATENT OFFICE

CHARLES P. CLARK, OF OLEAN, AND CARL A. BJORNSSON, OF WELLSVILLE, NEW YORK, ASSIGNORS TO CLARK BROS. CO., OF OLEAN, NEW YORK, A CORPORATION OF NEW YORK

DOUBLE ACTING INTERNAL COMBUSTION ENGINE

Application filed May 12, 1930. Serial No. 451,616.

The invention relates to double acting internal combustion engines of the type having an intermediate stepped piston for compressing one or more elements of the explosive mixture. The object of this invention is to provide an improved engine of this type.

The accompanying drawing illustrates an engine embodying the invention from which, in connection with the following description thereof, the nature of the invention will be understood; for clarity of illustration, many parts have been omitted from the drawing which are necessary to a complete engine but which are not immediately concerned with the present invention, as will be apparent: Fig. 1 is a plan view of the engine, partly in section. Figure 2 is a sectional elevation of the same.

The two power pistons 1 and 2, together with the intermediate stepped piston 5, form a piston structure which reciprocates as a unit in the cylinders, the power pistons 1 and 2 in the aligned cylinders 3—4 respectively and, the piston 5 in the compression cylinder 6 wherein the air for at least the scavenging of the power cylinders is compressed. As will be observed the compression cylinder 6 is located between the adjacent ends of the power cylinders 3 and 4. The opposite ends of the cylinders 3 and 4 are the head or explosion ends, and the heads 36 and 37 thereof are removable; the heads 36 and 37 may be fastened to the ends of the cylinders 3 and 4 by bolts (not shown) as will be understood. The engine illustrated is a two-cycle engine; ignition is caused by spark plugs (not shown) located, say, in the cylinder heads. Piston controled exhaust ports 7 and 8 pierce the side walls of the power cylinders respectively, and nearly opposite the exhaust ports, air inlet ports 9 and 10 also pierce the cylinder walls, all as customary in two-cycle engine practice. To avoid carrying the piston rod through one of the combustion spaces, we use, preferably, two or more piston rods 14 and 15 connected to the step piston 5, near the periphery thereof. These piston rods 14 and 15 connect the piston structure to the crosshead 16, the latter riding in a crosshead guide or guides 17 in the usual manner; connecting rod 18 connects the cross-head to the crank 19 of the engine shaft 20.

Scavenging and combustion air for the power cylinder 3 is compressed by the left hand face of the step piston 5, that is to say, in the space indicated by 23; likewise scavenging and combustion air for power cylinder 4 is compressed in the space 24. Glands or packing 25 serve to prevent the escape of air from compression space 24 along the piston rods 14 and 15. The air for the two ends of the compression cylinder 6 is taken from the atmosphere through separate inlet ports, or at least separate inlet valves 26 and 27, here represented as of the well-known multiple flat strip type; a passage 28, cored or otherwise in the fixed structure of the engine, opens from the valve 26 to the compression space 23 through the port 29 (Fig. 1) and also reaches to the cylinder inlet port 9 (Fig. 2), while another and separate passage 30 extends from the inlet valve 27 (Fig. 2) to the port 31 of the compression space 24 (see Fig. 1) and also reaches to the cylinder inlet port 10 (Fig. 2). As a consequence, reciprocation of the piston structure to the left draws air by suction through the air inlet valve 27 and into the compression space 24, and at the same time compresses air in the compression space 23 until the piston 1 opens the port 9; whereupon air compressed in space 23 flows through the passage 28 to the port 9 and thence into the cylinder 3, driving out the remaining exhaust gases and re-charging this cylinder with combustion air for the subsequent explosion. The subsequent reciprocation of the piston structure to the right draws a fresh charge of air by suction through the inlet valve 26 and passage 28 into the compression space 23, and at the same time compresses the air found in space 24 until the piston 2 opens the port 10, whereupon air from passage 30 passes into the cylinder 4 for scavenging and recharging and is replaced by air from compression space 24.

The pistons 1 and 2, or the ends 1 and 2 of the piston structure, are provided with piston rings 34 and 35 respectively, near the piston heads, as is to be expected from ordinary engine practice. As will be understood these rings must be inspected and replaced occasionally. For this purpose we so arrange the engine structure that both pistons 1 and 2 can be projected beyond the ends of their cylinders sufficiently (when the cylinder heads 36 and 37 have been removed) to expose so much of the length of each piston side-wall as is spanned by the rings; that is to say, the length 32 of piston 1 (Fig. 1) and the length 33 of piston 2 (Fig. 2). To this end, we make the length of the clearance space of the compression chamber 23 (as measured parallel to the axis of the cylinder structure) sufficient to give the step piston 5 a permissible path of travel to the left great enough to allow the length 33 of the power piston 2 to project beyond the left hand end of cylinder 4. To expose the rings 34 therefore, it is only necessary to remove the cylinder head 37 from the cylinder, remove the nuts 44 which fasten the piston rods 14 and 15 to the crosshead 16 in an ordinary manner, and slide the piston structure to the left. To permit the cylinder rings 35 of piston 1 to be exposed, we likewise make the clearance space of the compression chamber 24 of such length (measured parallel to the axis of the piston structure) that the piston structure can be moved far enough to the right to expose the rings 35 beyond the righthand end of the cylinder 3 without the step piston being stopped by the right hand head of its cylinder or the open end of the cylinder 2, as the case may be; and in addition we provide for permitting the piston rods 14 and 15 to be passed through the crosshead 16 at will, for such a distance as will permit this unusual movement of the piston structure. It will be understood that the movement of the cross-head 16 is limited by the throw of the crank 19, and hence if ordinary engine construction practices were followed, movement of the piston structure far enough to the right to expose the rings 35 (even though the clearance in the compression chamber 24 were sufficient to permit it) would be prevented by the engagement of those integral shoulders on rods 14 and 15 with the co-operating integral shoulders on the cross-head 16 through which power is transmitted from the piston rods to the crosshead as explosions move the piston structure to the right. However, instead of making these shoulders on the piston rods 14 and 15 integral with the piston rods and also making the cooperating cross-head shoulders integral with the cross-head, we make at least one set of these shoulders removable. This can be done conveniently, and preferably is done, by turning down or otherwise reducing the diameter of the piston rods 14 and 15 to a point 40 some distance back from the ends of the rods, the diameter of this reduced portion being such as to pass freely through the piston rod openings in the crosshead; and in addition, providing collars 41 to fill the space between the shoulders 40 and the cross-head shoulders 42 surrounding the piston rods. The reduced diameters being carried far enough back from the cross-head-ends of the piston rods 14 and 15, and the collars 41 being long enough (i. e. shoulders 40 set far enough back) to permit the extra movement of the piston structure which is required, it is simply necessary, in order to expose the piston rings 35, (starting say with the piston structure near the lefthand end of its stroke) to remove the nuts 44 from the piston rods, slide the crosshead 16 to the right until the piston rods are entirely free of the crosshead, slide off the collars 41 and, finally, slide the piston structure and the piston rods to the right, the piston rods now passing freely through these openings in the cross-head. It will be observed that in order to permit the power pistons 1 and 2 to be projected from the ends of their cylinders far enough to expose their piston rings as described, the total permissible path of travel of the intermediate step piston 5 between the two power cylinders 3 and 4, instead of being only a little more than twice the length of the crank 19 (i. e. twice the distance, indicated by 43, from the axis of the crank shaft 20 to the axis of the crank pin), must be considerably greater than twice the length of the crank; more specifically, this permissible path of travel of the piston 5 must be at least equal to twice the length 43 of the crank, plus the distance from the head end of the power cylinder 3 to the far or lefthand side of the group of piston rings 35, plus the distance from the head end of the cylinder 4 to the far or right hand end of the group of piston rings 34, these distances being measured when the respective power pistons are at dead centre between the finish of a compression stroke and the beginning of the next power stroke. Assuming the piston rings to be located in accordance with ordinary engine construction practice, the permissible path of travel of the piston 5 will need to be at least nearly equal to twice the length 43 of the crank plus the sum of the lengths 32 and 33 of the power piston side-walls spanned by the piston rings. It will be observed too that, assuming the piston rings 35 to be located in accordance with customary engine construction practices, the length of each collar 41 must be at least nearly as great as the length 32, and that the shoulders 40 must be set a corresponding distance from the cross-head ends of the piston rods 14 and 15, and the lengths of the reduced diameters of these rods must be correspondingly great.

An engine constructed as we have described, usually furnishes such a volume of air to the power cylinders that the loss of fuel through the exhaust ports, following each scavenging operation, is rather excessive if the fuel mixture is compressed in the compression cylinder 6. This loss of fuel can be avoided by the use of separate passages for the fuel whereby the mixing of the fuel with the air is delayed. Preferably we provide each cylinder with a fuel valve 45, 46, engine operated by cam shaft 47 which is driven by the crank shaft 20, valve rods 48 and rocker arms 49; closing springs 50 are added. The fuel, with or without the admixture of some air is piped to those valves, which the cam shaft holds open during certain portions of the engine cycle; for example, with engines operating on gas fuel, we usually so arrange the apparatus that the gas is admitted during, say, the first half of each compression stroke, after the respective exhaust port is closed. The fuel must be under sufficient pressure of course to overcome the pressure within and pass into the cylinders; it is immaterial however whether the fuel comes from a source already under pressure or whether a special pump is provided for compressing the fuel.

As usual with internal combustion engines, the pistons 1 and 2 are hollow, and usually we provide one or more ports 52 in the piston walls, somewhat adjacent the step piston 5 and hence opening into the compression spaces 23 and 24 and adjacent thereto an air deflector or deflectors 53. Thereby the alternate compression of air in and the withdrawal of air from the respective compression chambers 23 and 24, cause a flow of air into and from the interiors of the pistons 1 and 2, for cooling purposes. Preferably also, the piston structure 1, 5, 2 is made in two pieces joining at the step piston, as illustrated in Fig. 2; that is to say the piston 1 and adjacent half of the piston 5 are built together as a single unit, and the piston 2 and opposite half of the piston 5 are built together as another unit. And the two piston units are held together by the piston rods 14 and 15, shoulders 55 on these rods engaging one face of the piston 5 and nuts 56 engaging the opposite face. Plates 57 bolted to flanges within the two integral units of the piston structure prevent the interchange of air between compression chamber 23 and compression chamber 24, by way of the hollow piston structure.

It will be understood that the invention is not limited to the details illustrated and described except as appears hereinafter in the claims.

We claim:

1. In an internal combustion engine, two aligned power cylinders, removable heads for those ends of said power cylinders which are remote from each other, a compression cylinder, of greater diameter than said power cylinders, located between the opposite ends of the power cylinders, a piston structure comprising a piston for each of said power cylinders and an intermediate stepped piston for the compression cylinder, piston rings adjacent the head ends of said power pistons, and a crank shaft, a crank of which is connected to said piston structure for driving thereby, the length of the permissible path of travel of said stepped piston between the power cylinders being so much greater than twice the length of said crank that when the cylinder heads are removed and the piston structure is disconnected from the crank, the power pistons can be projected so far from the head ends of the power cylinders as to expose their piston rings.

2. In an internal combustion engine, two aligned power cylinders, removable heads for those ends of said power cylinders which are remote from each other, a compression cylinder, of greater diameter than said power cylinders, located between the opposite ends of the power cylinders, a piston structure comprising a piston for each of said power cylinders and an intermediate stepped piston for the compression cylinder, a group of piston rings at the head end of each power piston, and a crank shaft, a crank of which is connected to said piston structure for driving thereby, the length of the permissible path of travel of said stepped piston between the power cylinders being equal to at least twice the length of the crank plus the sum of the distances from the head ends of the power cylinders to the far sides of the respectively adjacent groups of piston rings, the said distances being measured when the respective power pistons are at dead centre between the finish of a compression stroke and the beginning of the next power stroke.

3. In an internal combustion engine, two aligned power cylinders, removable heads for those ends of said power cylinders which are remote from each other, a compression cylinder, of greater diameter than said power cylinders, located between the opposite ends of the power cylinders, a piston structure comprising a piston for each of said power cylinders and an intermediate stepped piston for the compression cylinder, piston rings adjacent the head ends of said power pistons, and a crank shaft, a crank of which is connected to said piston structure for driving thereby, the length of the permissible path of travel of said stepped piston between the power cylinders being equal to at least nearly twice the length of said crank plus the sum of the lengths of the side walls of the two power pistons spanned by the said piston rings.

4. In an internal combustion engine, two aligned power cylinders, removable heads for those ends of said power cylinders which are remote from each other, a compression cylinder, of greater diameter than said power cylinders, located between the opposite ends of the power cylinders, a piston structure comprising a piston for each of said power cylinders and an intermediate stepped piston for the compression cylinder, piston rings adjacent the head ends of said power pistons, and a crank shaft, a crank of which is connected to said piston structure for driving thereby, the length of the clearance space at each end of the compression cylinder, during normal operation of the engine, being greater than the distance from the head end of the respectively adjacent power cylinder to the far side of the said piston ring or rings of the piston contained in the respective cylinder, said distances being measured at the finish of compression strokes in the respective cylinders.

5. In an internal combustion engine, two aligned power cylinders, a compression cylinder, of larger diameter than said power cylinders, located between adjacent ends of the power cylinders, the opposite ends of the power cylinders being the head ends, a piston structure comprising a piston for each of said power cylinders and an intermediate stepped piston for the compression cylinder, a member to be driven, and a piston rod connecting said piston structure to said member to drive the latter, the head for that power cylinder which is located between said compression cylinder and member being removable, the piston rod and said member having cooperating shoulders through which the piston rod moves said member as the piston structure thrusts the piston rod toward the member, and one of said shoulders being removable so that the piston structure can be moved toward said member without moving said member.

6. In an internal combustion engine, two aligned power cylinders, a compression cylinder, of larger diameter than said power cylinders, located between adjacent ends of the power cylinders, the opposite ends of the power cylinders being the head ends, a piston structure comprising a piston for each of said power cylinders and an intermediate stepped piston for the compression cylinder, a cross-head, the head of the power cylinder between the cross-head and the compression cylinder being removable, a piston ring on the piston of said power cylinder adjacent its head end, a piston rod connected to said stepped piston adjacent the periphery thereof and extending through an opening in the cross-head, a portion of the cross-head-end of the piston rod having a diameter smaller than the diameter of said opening in the cross-head, a shoulder on the piston rod, and a removable collar on the piston rod between said shoulder and the cross-head to transmit the thrust of the piston rod to the cross-head, the length of said portion of the piston rod and the length of said collar being sufficient to permit, when the collar is removed, the piston rod to pass far enough through the cross-head to expose said piston ring beyond the end of its power cylinder.

7. In an internal combustion engine, two aligned power cylinders, a compression cylinder, of greater diameter than said power cylinders, located between adjacent ends of the power cylinders, removable cylinder heads for the opposite ends of said power cylinders, a piston structure comprising a piston for each of said power cylinders and an intermediate stepped piston for the compression cylinder, piston rings for the power pistons adjacent their head ends, the length of the permissible path of travel of said stepped piston between the power cylinders being great enough to permit the power pistons to be projected so far from the head ends of the power cylinders, when said cylinder heads are removed, as to expose the said piston rings, a cross-head, a piston rod connected to said stepped piston adjacent the periphery thereof and extending therefrom substantially parallel with said piston structure, outside the power pistons thereof, through an opening in said cross-head, the diameter of said piston rod for some distance from its cross-head-end being smaller than the diameter of said opening in the cross-head, a shoulder on the piston rod, and a collar on the piston rod between said shoulder and the cross-head to transmit the thrust of the piston rod to the cross-head, the length of said collar being sufficient and the piston rod having said smaller diameter for a sufficient length from its cross-head-end to permit the piston rod to pass far enough through the cross-head, when the collar is removed, to permit the piston-ring area of the adjacent power piston to be projected beyond the end of its cylinder.

8. In an internal combustion engine, two aligned power cylinders, a compression cylinder, of larger diameter than said power cylinders, located between adjacent ends of the power cylinders, the opposite ends of the power cylinders being the head ends, a piston structure comprising a piston for each of said power cylinders and an intermediate stepped piston for the compression cylinder, said piston structure being hollow and having a partition dividing its interior into two parts, and having a port through its walls at each side of said partition opening into the compression cylinder through which the gaseous fluid of the compression cylinder flows into and from the interior of the piston structure.

In testimony whereof, we have signed this specification.

CHARLES P. CLARK.
CARL A. BJORNSSON.